March 3, 1970 J. D. NUNNIKHOVEN ET AL 3,499,136
BALANCING MACHINE
Filed Nov. 25, 1966 2 Sheets-Sheet 2

JOE D. NUNNIKHOVEN
WILTON E. PARKER
INVENTORS.

BY
*Dominick Nardelli*
ATTORNEY

3,499,136
BALANCING MACHINE
Joe D. Nunnikhoven, Laguna Beach, and Wilton E. Parker, Rolling Hills, Calif., assignors to The Garrett Corporation, Los Angeles, Calif., a corporation of California
Filed Nov. 25, 1966, Ser. No. 597,099
Int. Cl. B23k 9/16, 9/00
U.S. Cl. 219—69                2 Claims

ABSTRACT OF THE DISCLOSURE

In a balancing machine, means for detecting the resultant unbalanced force produced by a rotating body and for removing material from the body while the body is rotating. The removal means is actuated by the unbalanced force through a control circuit that includes a display screen showing the phase and amplitude of the unbalanced force. An adjustable delay is incorporated in the control circuit so that the operator can adjust the delay time by observing on the display screen the phase shift or amplitude changes in the unbalanced force. The operator adjusts the timing so that he only observes a decrease in amplitude without a phase shift.

---

Figure 1:
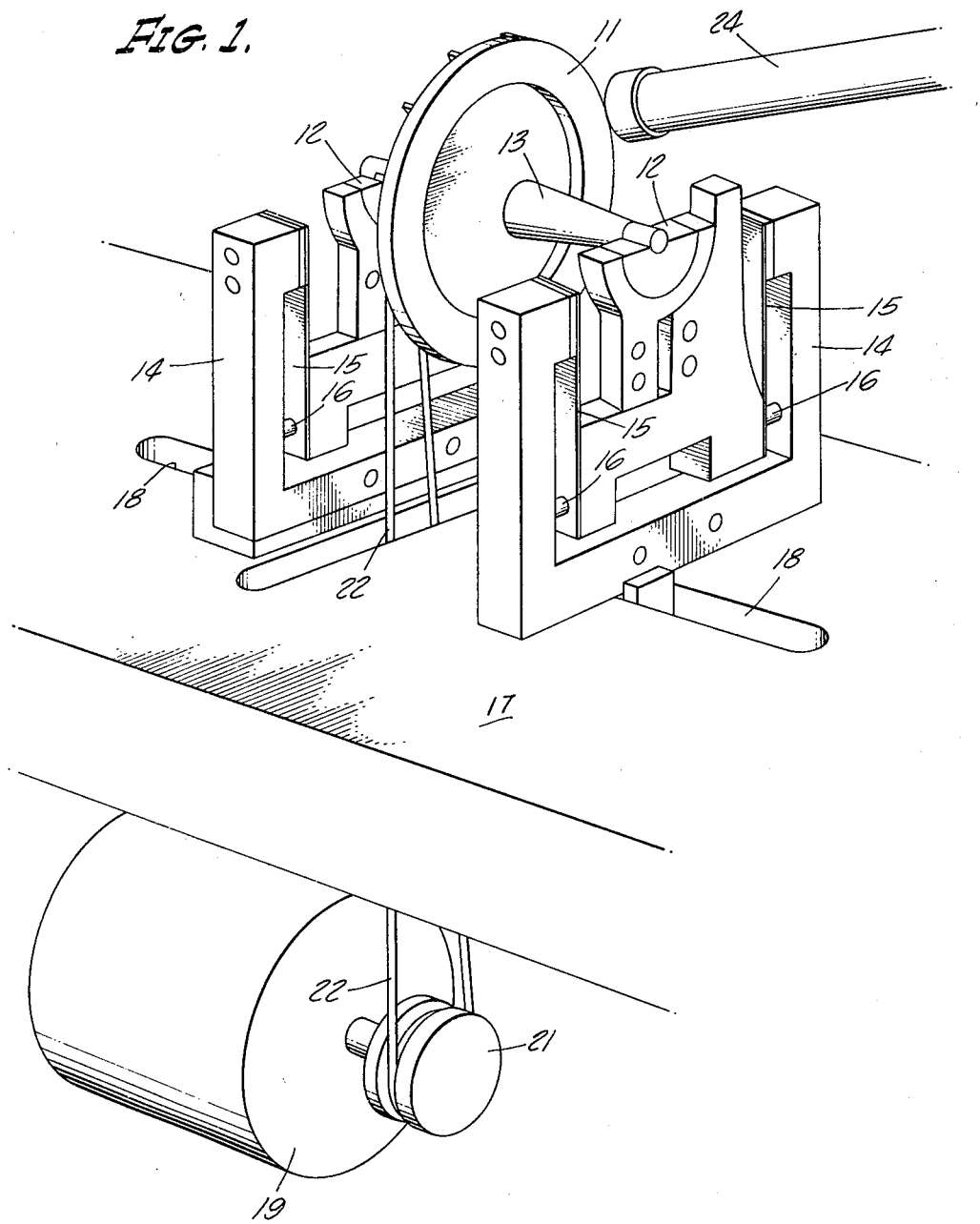

This invention relates to the art of balancing a rotatable body and more particularly to a method and means for determining the location of the unbalanced mass and then removing the out-of-balance mass while the body is rotating without adding to the bearing forces so that the material is removed under substantially the same conditions under which the rotor would be operating.

Up to now the common practice for balancing a rotatable body, or more commonly named a rotor, was to spin the rotor in a machine to determine the location and magnitude of the unbalanced mass therein, and then remove the rotor from the machine so that a small amount of material may be milled off the rotor. The number of times the above process would have to be repeated is determined by the degree of balance required for the rotor. Thus, in a rotor for a high speed machine where a high degree of balance is required, the balancing operation is repeated many times making it a costly time-consuming operation. In addition, if the rotor is to be installed in a gas turbine, the rotor may have to operate at speeds that cause elastic deformation in the rotor. Therefore, the above described balancing operation is not practical because the rotor must be disassembled from its bearing mounts, balanced and reassembled. The characteristics of the reassembled unit may not be the same. This is because the relative position of the parts has been disturbed thus producing different rotational characteristics causing the unit to be still unbalanced.

Therefore, an object of this invention is to remove the unbalanced mass from a rotor as the rotor is rotating at high speeds.

Another object of this invention is to combine a means for removing material with a balancing means wherein the material removing means is disposed to remove material from a rotor as the rotor is being rotated in the balancing means without adding additional loads to the bearings.

Briefly, the invention comprises a balancing machine which rotates a rotor at the required speed. The rotor is mounted on bearings each of which, due to the eccentricity of the center of gravity, is subjected to a radial force having a direction which rotates with the rotor. Transducer means are coupled to the bearings to produce a sine wave signal which represents the component of the rotating eccentric force within a plane which is parallel to the axis of rotation. The sine wave signal is fed to a pulse shaper that, in turn, produces a trigger pulse whenever the rotor completes 360° of angular rotation. The trigger pulses are used to trigger a material removal means, for example, a laser, which removes by volatilizing and expelling small particles of the material from the rotor at the same time the rotor is rotating and without inducing additional forces on the bearings. Thus, the sine wave during the removal of material only represents the eccentric force on the bearings. A strobe means, for example an oscilloscope, is used to observe where the material has been removed from the rotor. If the material has not been removed at the correct angular position, the trigger pulses are delayed by a suitable means, until the laser is observed to remove material along the radius of eccentricity.

These and other features and advantages of the invention will be more apparent after a perusal of the following specification taken in connection with the accompanying drawings wherein.

Figure 2:
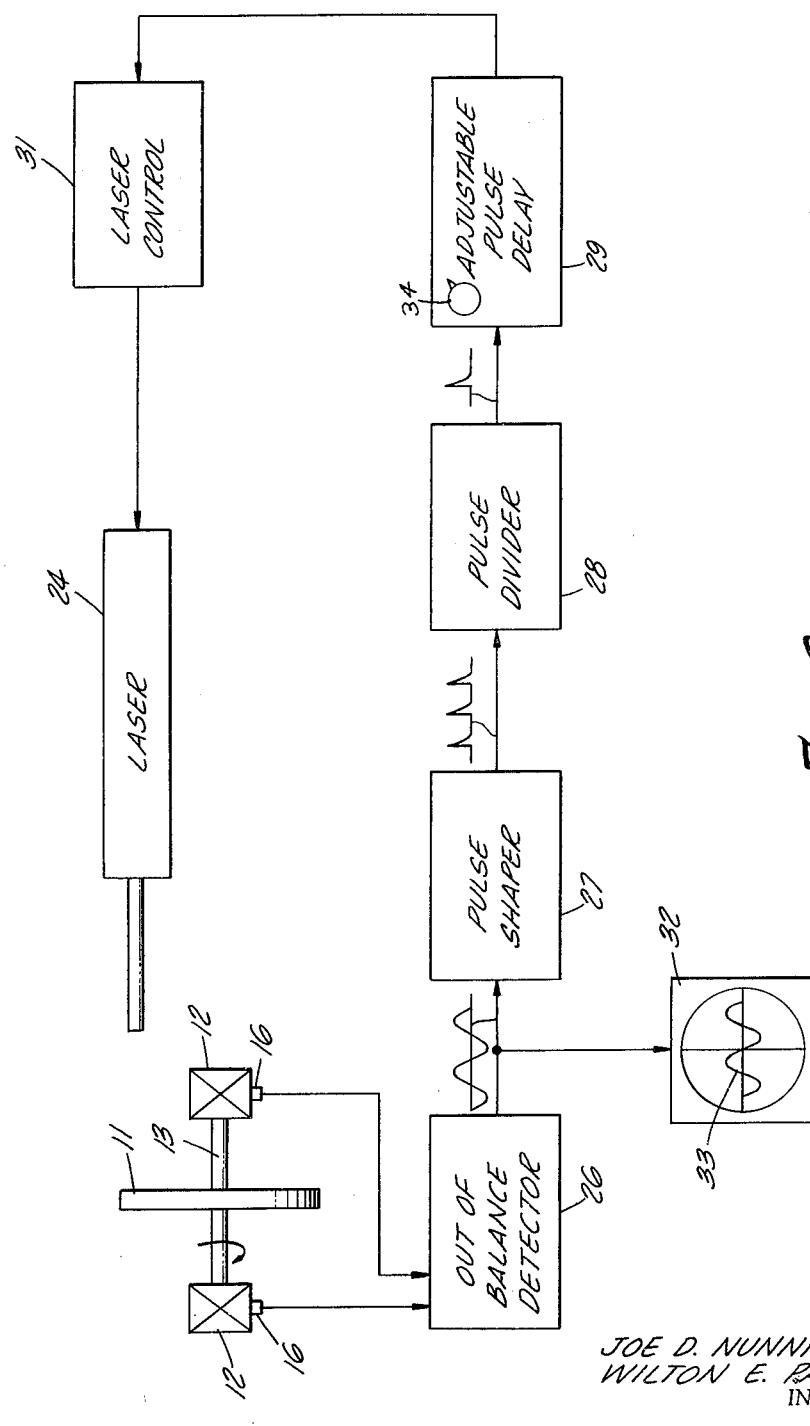

FIGURE 1 is a pictorial view of a rotor mounted on a balancing machine incorporating a laser; and
FIGURE 2 is a block diagram of the control circuit for the laser and balancing machine.

Referring to the drawings and to FIGURE 1 in particular, there is shown a rotor 11 mounted on suitable bearings 12 by a shaft 13 on the rotor which is disposed to rotate about a horizontal axis. Each bearing is supported within a U-shape member 14 by two flex-plates 15 which offer no resistance to horizontal bearing motion, and therefore the bearings 12 are able to move without resistance perpendicularly to the axis of rotation of the rotor in the horizontal direction only. Between the flex-plate 15 and the U-shape members 14 are mounted suitable transducers 16, as shown, which convert any motion between the two into an electrical signal. The U-shape members 14 are mounted on a table 17 and can be adjusted relative to each other through slots 18 so that different size rotors could be mounted for balancing on the machine. A means for rotating the rotor 11 is provided, and, in the embodiment shown, the means includes an electric motor 19 having a rotatable pulley 21 which engages a belt 22 which, in turn, rotates the rotor 11. However, if the rotor is to be tested at high speed, for example, 40,000 r.p.m., other means such as an air turbine drive could be used. In addition, a portion of a laser 24 is shown directing a very high intensity spot of coherent light on the rotor 11. A laser is an acronym for "Light Amplification by Stimulated Emission of Radiation."

Referring to FIGURE 2, there is shown a block diagram which illustrates how the laser and balancing equipment are combined so that the rotor 11 could be balanced while it is being rotated. Since the rotor 11 is rotated on bearings 12 which are free to move in the horizontal plane and normal to the axis of rotation, and since the out-of-balance radial bearing force vector is of constant length and rotating about a horizontal axis, its component in the horizontal plane varies as a sine function with respect to time. Thus the transducers 16 convert this changing component of the force vector to an electric signal having an inherent sine wave characteristic. The sine wave signals are coupled to an out-of-balance detector circuit 26 which couples either one of the signals or any portion of both to a pulse shaped 27. The pulse shaper 27 produces a pulse, for example, whenever the sine waves cross the zero line in the negative direction. Thus an accurately timed pulse is produced by the shaper 27 for every 360° angle of rotation of the rotor 11. However, when rotor 11 may be spinning, for example, at 40,000 revolutions per minute, the laser 24 may not be able to flash a coherent-light-beam at that frequency. Therefore, a pulse divider 28 is used to divide the pulses from shaper 27 by a factor, for example, three. In other words, the pulse divider 28 gates every third pulse (representing an accurate time interval for three complete revolutions of the rotor) to an adjustable pulse delay circuit 29 and then to a laser control circuit 31 which causes the laser to flash a high intensity coherent light spot on the rotor 11. The energy of the light spot is, for example, 150 watt-seconds and is focused on to a very small area. Thus a small amount of material would be volatilized (i.e., boiled away or expelled in minute particles or both) every time the laser flashed.

It should be noted that when the material is removed, this invention teaches a means whereby no additional force is placed on the bearings. Then when the next trigger pulse is produced, the pulse still represents the angular position of eccentricity on the rotor. The amount of material to be boiled away or expelled is, for example, in an aluminum rotor, one-fifth or more of a milligram in one laser flash. In order to determine if the material is being removed at the correct place, an oscilloscope 32 is also coupled to the output of the out-of-balance detector 26 so that the shape and relative position of a sine wave 33 is observed on the face thereof. If the laser 24 is triggered when the out-of-balance mass is aligned with the optical axis of the laser, i.e., on the same side of the axis of rotation as the laser, the amplitude of the sine wave would decrease but would not shift in location on the oscilloscope. On the other hand, if the laser 24 is triggered when the eccentric mass is positioned 180° relative to the laser, the amplitude of the sine wave would increase and also no shift in the sine wave would be observed. Any other angular displacement between the eccentric mass and the laser would cause a shift in the sine wave on the oscilloscope relative to the vertical center line. Thus, the pulse delay circuit 29 includes an adjustment means 34 which changes the time that a pulse is delayed so that the laser may be triggered at the same time the eccentric mass is aligned with the optical axis of the laser.

Although the preferred embodiment of this invention shows a laser removing material from the rotor as the rotor rotates in the balancing machine, the rotor could be mounted in the same housing and bearings in which the rotor is to be ultimately assembled. Then the housing would be installed in a suitable balancing machine and the transducers placed to pick up the eccentric force on the bearings. The laser beam would enter the housing through a suitable window. In addition, other types of material removal means could also be used in this invention. The main requirement for the material removal means is that it removes material without adding any additional loads to the bearings. Another type of material removal means is, for example, a spark discharge machining apparatus. Various other modifications and variations of the present invention are contemplated and will become apparent to those skilled in the art without departing from the spirit and scope of the invention. Therefore, the invention is not limited to the exemplary apparatus or procedure described but includes all embodiments within the scope of the claims.

What is claimed is:

1. A method of locating and correcting unbalance in a rotatable body comprising the steps of:
   rotatably mounting said body on an apparatus means,
   rotating said body on a substantially fixed axis,
   sensing any unbalanced force component in a direction normal to said axis which force component is produced by said rotating body and displaying the force component,
   producing at least one signal in response to said force component which signal represents a particular rotational position of said body about said axis,
   triggering a pulse of concentrated energy at said body in response to said signal so that said energy volatilizes the material on said body as the body is rotating without adding additional unbalanced forces,
   observing any phase shifting and any increases in the unbalanced force component, and
   adjusting the timing of the pulses with respect to the angular position of the rotating body so that the amplitude of the unbalanced force component decreases after each pulse.

2. An apparatus for locating and correcting unbalance in a rotatable body comprising:
   first means including bearing means for rotating said body on its normal axis of rotation,
   second means for sensing the bearing loads as said body rotates,
   third means for sensing the force component of the bearing loads within a plane parallel to the axis of rotation, and for producing at least one signal in response to said force component which said at least one signal represents a particular rotational position of said body about said axis, and
   fourth means responsive to said signals for directing a pulse of energy towards said body for volatilizing a predetermined portion of said body as the body is rotating and without aplying additional loads on the bearing means;
   said third means including:
      a pulse shaper means for producing an electric pulse in response to said signal for every revolution of said rotor, and
      adjustable delay means for delaying the electric pulses a given time before the electric pulses are fed to said fourth means; and
      an oscilloscope to graphically represent the force component sensed by said third means in order to observe where the material is being removed from the rotor.

References Cited

UNITED STATES PATENTS

| | | | |
|---|---|---|---|
| 3,192,318 | 6/1965 | Schleich et al. | 219—121 |
| 3,196,246 | 7/1965 | El-Kareh | 219—121 |
| 3,259,730 | 7/1966 | Wehde et al. | 219—121 |
| 3,265,855 | 8/1966 | Norton | 219—121 |
| 3,267,250 | 8/1966 | Ullery | 219—121 |
| 3,301,949 | 1/1967 | Ullery | 219—121 |
| 3,369,101 | 2/1968 | Di Curcio | 219—121 |
| 3,383,492 | 5/1968 | Solomon | 219—121 |

RICHARD M. WOOD, Primary Examiner

W. DEXTER BROOKS, Assistant Examiner

U.S. Cl. X.R.

219—121